(12) United States Patent
Sanchez et al.

(10) Patent No.: US 6,183,899 B1
(45) Date of Patent: Feb. 6, 2001

(54) MAINTENANCE-FREE OPEN INDUSTRIAL TYPE ALKALINE ELECTROLYTE STORAGE BATTERY

(75) Inventors: Patrick Sanchez, Le Pian Medoc; Edith Metayer, Le Bouscat; Marc Bariand; Jean-Louis Liska, both of Bordeaux, all of (FR)

(73) Assignee: Alcatel, Paris (FR)

( * ) Notice: Under 35 U.S.C. 154(b), the term of this patent shall be extended for 0 days.

(21) Appl. No.: 09/038,959

(22) Filed: Mar. 12, 1998

(30) Foreign Application Priority Data

Mar. 13, 1997 (FR) .................................................. 97 02989

(51) Int. Cl.[7] .................................................. H01M 2/12
(52) U.S. Cl. ................. 429/53; 429/59; 429/206
(58) Field of Search ................. 429/59, 206, 53

(56) References Cited

U.S. PATENT DOCUMENTS

| | | | |
|---|---|---|---|
| 4,436,795 | * | 3/1984 | Cooper et al. . |
| 4,880,435 | * | 11/1989 | Itou et al. . |
| 5,128,217 | * | 7/1992 | Liska et al. ............... 429/53 |
| 5,576,116 | * | 11/1996 | Sanchez et al. . |

FOREIGN PATENT DOCUMENTS

| | | | |
|---|---|---|---|
| 0354966A1 | * | 2/1990 | (EP) . |
| 0401076A1 | * | 12/1990 | (EP) . |
| 06666608 | * | 8/1995 | (EP) . |
| 2628892A1 | * | 9/1989 | (FR) . |
| 2203280 | * | 10/1988 | (GB) . |
| WO9715959 | * | 5/1997 | (WO) . |

OTHER PUBLICATIONS

Patent Abstracts of Japan, vol. 009, No. 321 (E–367), Dec. 17, 1985 corresponding to JP 60 154477 A (Shnikoube Denki KK ) Aug. 14, 1985.*
Patent Abstracts of Japan, vol. 010, No. 352 (E–458) Nov. 27, 1986 corresponding to JP 61 151965 A (MAtsushita Electric Ind Co Ltd) Jul. 10, 1986.*

* cited by examiner

*Primary Examiner*—John S. Maples
(74) *Attorney, Agent, or Firm*—Sughrue, Mion, Zinn, Macpeak & Seas, PLLC

(57) ABSTRACT

A maintenance-free open industrial storage battery includes an electrode assembly comprising at least one positive electrode, one negative electrode, one separator disposed between the negative electrode and the positive electrode, an alkaline electrolyte covering the top end of the assembly before electrical cycling and a valve the relative operating pressure of which is less than 1 bar. The total capacity of the negative electrodes is greater than the total capacity of the positive electrodes. The separator is permeable to oxygen and the storage battery contains an oxygen recombination device such that after at least one cycle of charging and discharging the storage battery operates without loss of electrolyte at a charging current at least equal to Ic/10 where Ic is the current discharging the capacity of the storage battery in one hour.

5 Claims, 2 Drawing Sheets

MAINTENANCE-FREE OPEN INDUSTRIAL TYPE ALKALINE ELECTROLYTE STORAGE BATTERY

BACKGROUND OF THE INVENTION

1. Field of the Invention

The present invention concerns an industrial aqueous alkaline electrolyte open secondary storage battery, i-e. one having a high capacity in the range 10 Ah to 200 Ah and "open" in the sense that it operates at a low pressure (less than 1 bar relative). Storage batteries of this kind are in particular of the nickel-cadmium (Ni—Cd) or nickel-metal hydride (Ni—MH) type.

2. Description of the Prior Art

An open industrial storage battery includes an electrode assembly comprising a plurality of electrode pairs consisting of a positive electrode, a negative electrode and a separator that is only slightly permeable to gases disposed between the positive and negative electrodes, together with an alkaline electrolyte in which the assembly is immersed and the level of which is above the top edge of the electrodes. On overcharge, aqueous electrolyte storage batteries generate oxygen at the positive electrode and hydrogen at the negative electrode. An open storage battery operates at a relative pressure (pressure difference relative to atmospheric pressure) less than 1 bar and the gases generated on overcharge escape, consuming water from the electrolyte. The storage battery therefore requires regular maintenance, i.e. water must be added periodically. The maintenance frequency depends on the operating conditions of the storage battery in the application concerned, in particular on the charged capacity.

To avoid topping up the electrolyte level after periods of operation sealed industrial type storage batteries have been derived from those previously described (U.S. Pat. No. 5,576,116). A sealed industrial (high-capacity) storage battery includes an electrode assembly comprising a plurality of electrode pairs consisting of a positive electrode, a negative electrode and a gas-permeable separator disposed between the negative and positive electrodes, a limited quantity of alkaline electrolyte and an oxygen recombination device. The oxygen formed at the positive electrode increases the pressure inside the storage battery which depends on the overcharge conditions employed. Permanent conditions are established thereafter in which the oxygen produced at the positive electrode is reduced, or recombined, at the negative electrode. A sealed industrial storage battery has a safety valve operating at a relative pressure higher than 1 bar. Although a sealed storage battery can solve the technical problem associated with maintenance, its energy per unit mass and per unit volume are lower than those of an open storage battery. On the one hand the sealed storage battery has a precharge and an excess of negative capacity designed to prevent the release of hydrogen at the end of charging. On the other hand such storage batteries contain a small quantity of electrolyte and consequently the yield of the active material is lower than in open storage batteries.

It has therefore appeared desirable to work towards reducing the maintenance of open storage batteries. U.S. Pat. No. 5,128,217 proposes self-limitation of the charge of an Ni—Cd storage battery based on the sharp increase in the voltage at the end of charging. This open industrial storage battery operates at a relative pressure less than 1 bar and contains excess electrolyte.

The aim of the present invention is to propose an open industrial storage battery requiring no maintenance with energy per unit volume and per unit mass higher than those of a sealed industrial storage battery.

SUMMARY OF THE INVENTION

The present invention consists in a maintenance-free open industrial storage battery including an electrode assembly comprising at least one positive electrode, one negative electrode, one separator disposed between the negative electrode and the positive electrode, an alkaline electrolyte covering the top end of the assembly before electrical cycling and a valve the relative operating pressure of which is less than 1 bar, wherein the total capacity of the negative electrodes is greater than the total capacity of the positive electrodes, the separator is permeable to oxygen and the storage battery contains an oxygen recombination device such that after at least one cycle of charging and discharging the storage battery operates without loss of electrolyte at a charging current at least equal to Ic/10 where Ic is the current discharging the capacity of the storage battery in one hour.

In the early cycles the storage battery of the invention operates like an open storage battery. The abundant quantity of electrolyte means that the high performance of open storage batteries can be achieved and conserved. As long as the electrolyte is in excess, the recombination device is relatively inaccessible and oxygen reduction is not encouraged. During charging the gas pressure rises and the valve allows the gas to escape, and water is therefore consumed. The water loss is estimated at approximately 0.3 $cm^3$ per ampere-hour of overcharge. As the excess electrolyte is consumed the reduction of the oxygen occurs with a higher yield. After a few cycles the storage battery has achieved equilibrium between the release and the recombination of oxygen. The pressure inside the storage battery remains below the operating pressure of the valve, generally in the range 0.5 bar to 1 bar. The storage battery of the invention then operates like a sealed storage battery and requires no further maintenance.

The negative electrodes have a low excess capacity relative to the capacity of the positive electrodes. At the end of charging the negative electrodes are completely charged. The total capacity of the negative electrodes is preferably in the range 100% to 150% of the total capacity of the positive electrodes.

The gas-permeable separator allows access from the negative electrode to the oxygen generated at the positive electrode so that recombination occurs. The presence of a recombination device significantly increases the rate of recombination and enables equilibrium to achieved, even in deep cycling duties. A recombination system of this kind is described in U.S. Pat. No. 5,576,116.

The distance between the negative electrodes and the positive electrodes is advantageously in the range 0.2 mm to 0.5 mm. The distance between the electrodes is made as small as possible whilst avoiding the risk of short-circuits. Depending on the application it can range from 0.2 mm for applications that are relatively undemanding, for example the aeronautical field, up to 0.5 mm if the cycling conditions lead to greater variations in the electrode dimensions, in particular in the case of use in an electric vehicle.

In one variant the positive electrodes are of the sintered type and the negative electrodes are of the paste type on a conductive support selected from a two-dimensional support such as a solid or perforated strip, expanded metal, a grid or woven material and a three-dimensional support such as foam or felt.

In another variant the positive electrodes are of the paste type on a three-dimensional conductive support and the negative electrodes are of the paste type on a two-dimensional or a three-dimensional conductive support.

The maintenance-free storage battery of the invention is particularly suitable for use in the aeronautical or railroad field and for electric vehicle propulsion.

The invention will be better understood and other advantages and features will appear from a reading of the following description of one embodiment given by way of non-limiting illustrative example and from the accompanying drawings.

DETAILED DESCRIPTION OF THE PREFERRED EMBODIMENT

Figure 1:
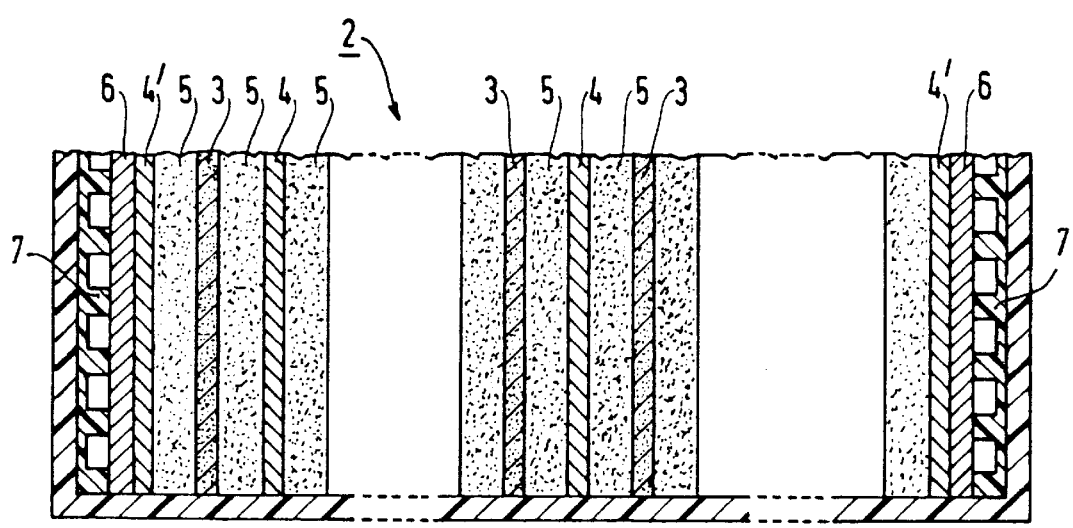
FIG. 1 is a part-sectional view of a storage battery of the present invention.

Referring to FIG. 1, an open storage battery of the invention comprises a plastics material parallelepiped-shape casing 1 and an electrode assembly 2 comprising a plurality of pairs of electrodes consisting of a positive electrode 3 and a negative electrode 4 between which is a gas-permeable separator 5.

At the end of the assembly 2 is a recombination electrode 6 associated with a spacer 7 that is preferably incompressible and hydrophobic. The recombination electrode 6 is electrically connected to the negative polarity. The electrode assembly usually includes a additional negative electrode so that it is bordered by two external negative electrodes 4', each being in contact with a recombination electrode 6 associated with a spacer 7.

A maintenance-free nickel-cadmium storage battery A was made in accordance with the invention. The plasticized type negative electrode comprised a perforated nickel-plated steel tape onto which had been deposited a paste comprising a polymer binder, cadmium in metallic form (Cd) and in oxide form (CdO) and the usual shaping additives. The sintered type positive electrode was formed on a sintered porous nickel support incorporating an active material based on nickel hydroxide. The gas-permeable separator comprised two layers of polypropylene felt impregnated with electrolyte in the form of an aqueous solution of potassium hydroxide KOH and lithium hydroxide LiOH at a concentration of 7.8 N., The quantity of electrolyte introduced into the storage battery corresponded to the volume of electrolyte absorbed by the electrode assembly and the recombination device (reference quantity) augmented by an excess quantity corresponding to complete immersion of the electrode assembly and the recombination device to the point where the top end of the electrode assembly was covered. This excess quantity represented at least 32% of the reference quantity. The valve opened towards the exterior when the pressure difference between the interior of the storage battery and atmospheric pressure was equal to at least 0.5 bar.

A sealed nickel-cadmium industrial storage battery B was made for comparison. This storage battery differed from the storage battery A in that it did not contain any excess electrolyte, had an uncharged excess negative capacity to prevent the release of hydrogen at the end of charging of the storage battery, and was equipped with a safety valve operating at a relative pressure above 1 bar.

An open nickel-cadmium industrial storage battery C was made for comparison. This storage battery differed from the storage battery A in that it contained a gas-impermeable separator consisting of two layers of polypropylene felt and a microporous membrane. The electrolyte was an aqueous solution of potassium hydroxide KOH and lithium hydroxide LiOH at a concentration of 6 N.

The quantity of electrolyte introduced into the storage battery corresponded to the volume of electrolyte absorbed by the electrode assembly (reference quantity) augmented by an excess quantity corresponding to complete immersion of the electrode assembly to the point where the top end of the electrode assembly was covered to a depth of 20 mm. The excess quantity represented 60% of the reference quantity.

The storage batteries A, B and C were evaluated by the following comparative electromechanical tests.

(I)—Capacity test.

A capacity test was conducted to determine the real capacity of the storage battery:

charge at Ic5 where Ic is the current to discharge the capacity of said storage battery in one hour, then overcharge at Ic/10 with an overcharge coefficient of +50%, discharge at Ic/2 to a cut-off voltage of 0.9 volts.

The initial characteristics of the storage batteries A, B and C including the capacities actually measured are set out in table I below. The gain corresponds to the difference between the real and nominal capacities divided by the nominal capacity.

TABLE I

|  | Initial characteristics: | | |
| --- | --- | --- | --- |
|  | A | B | C |
| Distance between electrodes (mm) | 0.5 | 0.25 | 0.5 |
| Excess electrolyte (%) | +32 | 0 | +60 |
| Nominal capacity (Ah/electrode) | 3.1 | 3.1 | 3.1 |
| Real capacity (Ah/electrode) | 3.5 | 3.1 | 3.5 |
| Gain (%) | +13 | 0 | +13 |

At the start life the capacity recoverable from storage battery B conformed to the theoretical capacity; that for the storage batteries A and C was higher than predicted and indicates the high activation of the positive electrode associated with the excess electrolyte.

(II) Cycling test.

A cycling test of 270 cycles was carried out to observe the electrochemical behavior of the storage battery:

charge at Ic/5, overcharge at Ic/10 with an overcharge coefficient of +20%, rest for 1 h, discharge at Ic/2 to a depth of discharge corresponding to 70% of the nominal capacity, rest for 4 h.

Table II summarizes the comparative results for operation of storage batteries A, B and C during the first 44 cycles. Table II gives the internal pressure, the mass variation and the rate of recombination observed after an overcharge at Ic/10. The internal pressure was limited to 0.5 bar by the valve in the case of storage battery A; the internal pressure reached by the storage battery B in this case was very much lower than the limit imposed by the valve.

The recombination rate R was calculated using the equation:

$$R = 100 \times [1 - \Delta m/(E \times S)]$$

where $\Delta m$ is the variation in the mass of the battery, i.e. the loss of water, E=0.33 corresponds to the quantity of water consumed per 1 ampere-hour overcharge and S is overcharge expressed as a number of ampere-hours, so that (E×S) represents the theoretical water loss.

TABLE II

|  | A | B | C |
|---|---|---|---|
| Internal pressure (bars) | 0.5 | 0.6 | 0 |
| Loss of mass per cycle (mg) | 393 | 0 | 1300 |
| Recombination rate (%) | 75 | 100 | 15 |

The theoretical consumption was 66 g of water for storage battery A of the invention during the first 44 cycles with a 200 Ah overcharge. The total loss of mass of storage battery A during this cycling was found to be 17.3 g, much lower than the theoretical quantity. The internal pressure was set at 0.5 bar by the valve.

During cycling of storage battery B the internal pressure stabilized at 0.6 bar and the mass did not vary. storage battery C, the internal pressure of which was not limited by the valve, had to be topped up periodically during the cycling test.

The results set out in table III below show the loss of mass and the recombination rate during cycling of storage battery A of the invention up to 270 cycles under the same conditions as previously.

TABLE III

|  | Cycles 45–147 | Cycles 149–249 | Cycles 252–270 |
|---|---|---|---|
| Loss of mass per cycle (mg) | 168 | 7 | 0 |
| Recombination rate (%) | 88 | 99.5 | 100 |
| Internal pressure (bar) | 0.5 | ≈0.5 | <0.5 |

Three phases of operation of storage battery A of the invention could be distinguished during the cycling test. During the early cycles the internal pressure was higher than the pressure at which the valve opened, leading to high consumption of electrolyte on each cycle because the valve allowed the gases to escape. This was followed by an intermediate phase in which the pressure and the mass stabilized.

Finally, after approximately 250 charge/discharge cycles, the internal pressure was below the pressure at which the valve opened. The recombination rate was close to 100% reflecting operation close to that of a sealed storage battery.

Figure 2:
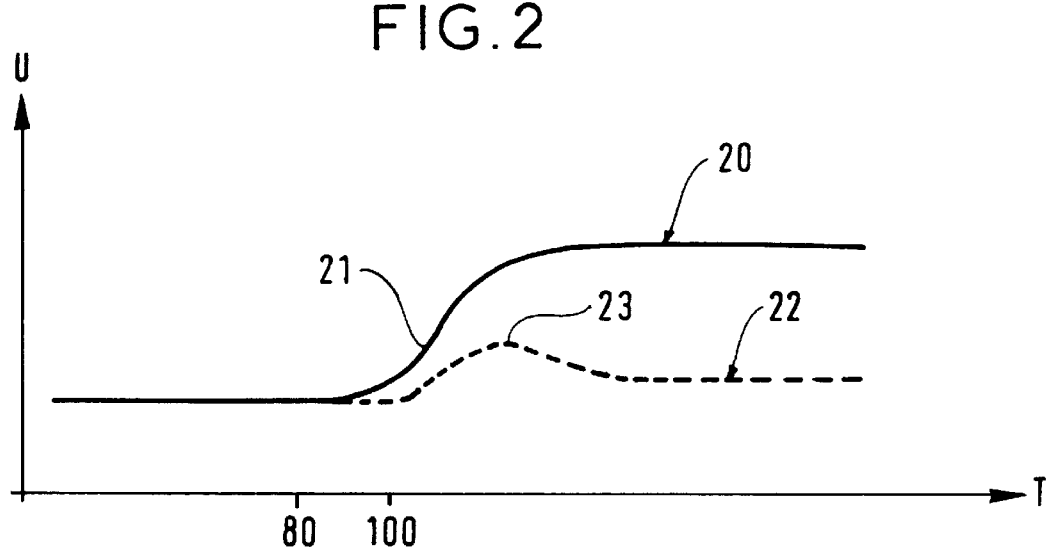
FIG. 2 shows the variation of the voltage U in volts of the storage battery of the invention as a function of its charge T in percent.

Curve 20 in FIG. 2 is the charging curve for an open industrial storage battery requiring maintenance. When the storage battery is charged (charge rate≧100%) hydrogen is generated (the rising part 21 of the curve) at the negative electrode in amounts corresponding to the overcharge.

Curve 22 in FIG. 2 represents the charging of the maintenance-free open industrial storage battery of the invention after 250 cycles. The recombination of the gases 23 reduces the pressure rise. No hydrogen is generated.

Figure 3:
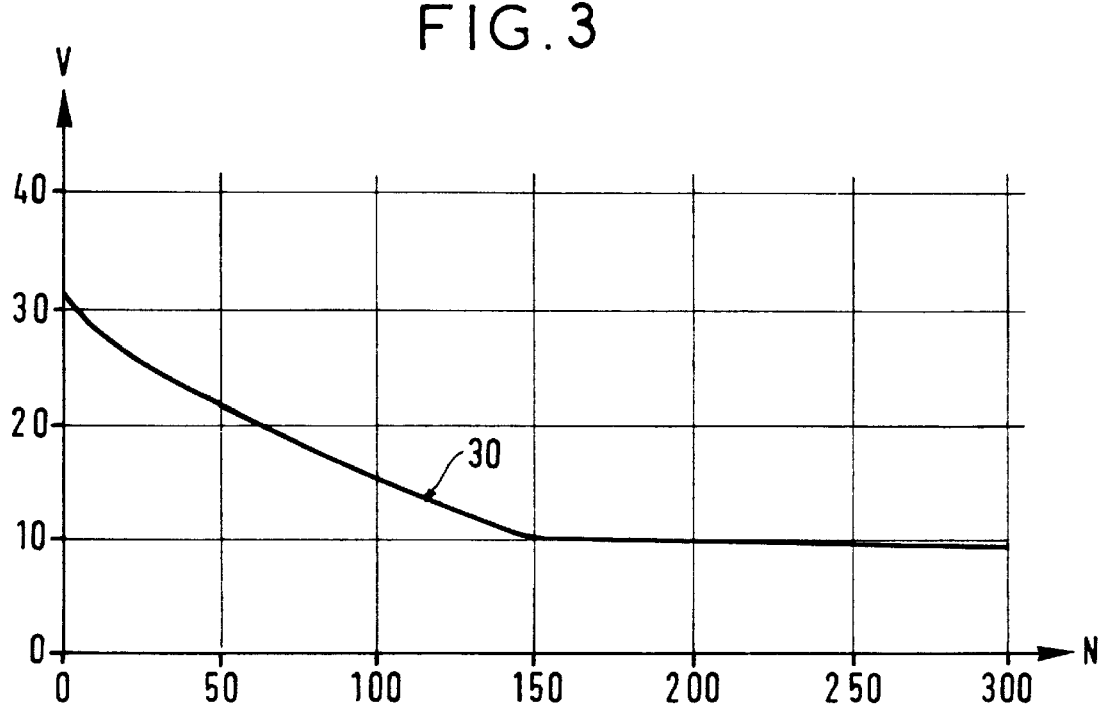
FIG. 3 shows how the excess quantity V of electrolyte initially introduced into the storage battery of the invention varies, expressed as a percentage relative to the quantity of electrolyte absorbed by the electrode assembly and the recombination device depending on the number N of cycles effected.

Curve 30 in FIG. 3 shows that the excess electrolyte initially introduced (+32%) decreased visibly up to cycle 149 and then tended to stabilize at a value in the order of +10%.

Table IV below sets out the capacities observed after 272 cycles.

TABLE IV

|  | A | B | C |
|---|---|---|---|
| Nominal capacity (Ah/electrode) | 3.1 | 3.1 | 3.1 |
| Initial real capacity (Ah/electrode) | 3.5 | 3.1 | 3.5 |
| Capacity after 272 cycles (Ah/electrode) | 3.8 | 3.3 | 3.8 |

For the sealed storage battery B the capacity as measured after cycling conformed to the capacity expected from the design and the manufacture of the battery. For the open storage battery C and the maintenance-free storage battery A of the invention the capacity obtained was more than 20% (22.6%) higher than the theoretical value.

The above electrical tests show up the following features of the storage battery A of the invention:
- a capacity higher than predicted for the design,
- very low electrolyte consumption after 150 cycles and virtually no consumption after 250 cycles,
- stable capacity during cycling,
- behavior very similar to a sealed industrial storage battery with an internal, pressure less than 0.5 bar after 250 cycles.

The maintenance-free open industrial storage battery of the invention achieves gains in the order of 15% to 30% in terms of energy per unit mass and 20% to 40% in terms of energy per unit volume compared to a prior art sealed industrial storage battery.

There is claimed:

1. A maintenance-free open industrial storage battery include an electrode assembly comprising at least one positive electrode, one negative electrode, one separator disposed between said negative electrode and said positive electrode, an alkaline electrolyte covering a top end of said assembly before electrical cycling and a valve the relative operating pressure of which is less than 1 bar, wherein the total capacity of said negative electrodes is at least as great as the total capacity of said positive electrodes, said separator is permeable to oxygen and said storage battery contains an oxygen recombination device such that after at least one cycle of charging and discharging said storage battery operates without loss of electrolyte at a charging current at least equal to Ic/10 where Ic is the current discharging the capacity of said storage battery in one hour.

2. The storage battery claimed in claim 1 wherein said total capacity of said negative electrodes is in the range 100% to 150% of said total capacity of said positive electrodes.

3. The storage battery claimed in claim 1 wherein said negative electrodes and said positive electrodes are separated by a distance in the range 0.2 mm to 0.5 mm.

4. The storage battery claimed in claim 1 wherein said positive electrodes are of the sintered type and said negative electrodes are of the paste type on a two-dimensional or a three-dimensional conductive support.

5. The accumulator claimed in claim 1 wherein said positive electrodes are of the paste type on a three-dimensional conductive support and said negative electrodes are of the paste type on a two-dimensional or a three-dimensional conductive support.

* * * * *